United States Patent Office 3,356,516
Patented Dec. 5, 1967

3,356,516
PROTEIN ADHESIVE PREPARATION
Hellmuth C. Schwalbe, Chillicothe, Ohio, assignor to The Mead Corporation, Dayton, Ohio, a corporation of Ohio
No Drawing. Filed Feb. 13, 1963, Ser. No. 258,153
10 Claims. (Cl. 106—146)

This invention relates to a process for preparing proteinaceous adhesives suitable for use in high solids pigmented paper coating compositions adapted for application to paper webs on high speed paper machines. More particularly, it relates to a method for reducing the viscosity of protein solutions.

Protein adhesives have been used in the coating of paper for a great many years. Initially, such coating operations were carried out on equipment separate from the paper manufacturing machine, and were operated at relatively low solids concentration. With this development of methods for the application of coatings to paper webs on the paper machine, problems associated with protein adhesive became apparent.

It was found, for example, that casein, the best known coating adhesive of the prior art, resulted in highly viscous coating compositions which tended to show the property of dilatancy. A coating composition exhibiting dilatant properties is one which departs from Newtonian viscosity characteristics and exhibits an apparent increase in viscosity as the rate of shear to which the material is subjected is increased. Dilatant compositions gave problems in transferring coating films from roll surfaces to the paper web, and resulted in objectionable patterns in the film deposited on the paper surface.

Early attempts to overcome these deficiencies were not commercially satisfactory. One such prior method was to subject casein to the action of a proteolytic enzyme, but this was found to be an extremely difficult process to control and did not lead to consistent results. Another approach to the problem involved the use of a soya bean protein which had to be isolated from soya beans as a byproduct of the production of soya bean oil. This soya bean protein was partially hydrolyzed by the manufacturer and yielded coating compositions of more tractable viscosity characteristics. However, when this protein hydrolysis step is omitted, soya protein exhibits all the problems and disadvantages of casein in the preparation of machine coated papers.

Likewise, various attempts have been made to utilize the ground meal remaining after the expression of oil from soya beans which is generally marketed under the designation of soya flour. Again, since the protein content of the soya flour had not been hydrolyzed in processing, the viscosity of the coating compositions prepared therefrom possessed the same disadvantages associated with casein.

In spite of the shortcomings of the prior protein adhesives, the use of proteins has persisted since papers coated with proteinaceous adhesives can readily be treated to impart a measure of water resistance to the coated surface, thus making such papers suitable for lithographic printing. However, the trade has long felt the need for proteinaceous adhesives of improved viscosity characteristics which can be incorporated into coating compositions for application to paper webs at high solids content on modern fast running paper machines.

According to the present invention, a method has been found for processing casein, soya flour and native (unhydrolyzed) soya protein to render the viscosity characteristics more tractable to use in high solids paper coating compositions. Coatings prepared from the adhesives of this invention do not show any tendency toward dilatancy, have a significantly reduced viscosity and may be applied in relatively pattern free films to paper webs to produce high grade printing surfaces which have sufficient moisture resistance for offset printing.

Accordingly, it is an object of the present invention to provide proteinaceous adhesives suitable for use in high solids coating compositions for application to paper.

It is a further object of the present invention to provide a method for reducing and controlling the viscosity of proteinaceous adhesives by subjecting them to the action of a high velocity steam jet at superatmospheric pressure.

Another object is to provide a protein adhesive which is suitable for use in such high solids coating compositions.

Other objects will become apparent from a reading of the specification which follows, taken together with the appended claims.

The present invention involves a process for treatment of proteinaceous adhesive materials such as casein, native (unhydrolyzed) soya protein, and soya flour by first preparing an alkaline solution of the protein, and then subjecting it to high shearing conditions at high temperature for a relatively short time interval. It has been found that the action of high shearing forces at high temperature will materially reduce the viscosity of such proteinaceous adhesives, and will result in suitable solids concentrations for the preparation of high solids paper coating compositions. Furthermore, the coating compositions prepared from the adhesives of this invention show remarkable freedom from objectionable surface patterns when applied on a paper machine by the usual methods employed in the art of machine coating.

Proteins generally are high molecular weight polymers of amino acids which are joined together by peptide linkages. These protein polymers can be dissolved or dispersed into colloidal sols by treatment with alkalies at moderate temperature. The mechanism of such solubilizing action is apparently one of salt formation between the alkali used and the acid groups of the casein or protein molecule. In preparing such solutions of proteins, it has long been observed that careful control of temperature is critical as otherwise, exposure to moderately high temperatures, for relatively short time periods (of the order of fifteen minutes or more) results in a significant darkening of the adhesive material. This dark color carries over into the coating compositions and results in reduced brightness on paper coated therewith. Thus, almost without exception, the art has taught that such protein solutions should be prepared at relatively low temperatures not to exceed 140° F.

It was therefore surprising to discover that the treatment of such protein solutions under conditions of high shear at temperatures up to or above 300° F. did not result in discoloration of the adhesive. This is apparently a time controlled factor, and since the process of the present invention utilizes such high temperatures for relatively short time periods, the color of the adhesives so treated is not adversely affected.

While the step of subjecting protein solutions to high shear at high temperature can be carried out in a variety of equipment, the preferred method utilizes the injection of high velocity steam jets into a stream of the protein solution under conditions which subject the protein solution to an intensive shearing action. However, mechanically induced shear accompanied by high temperature will accomplish substantially the same result, although such equipment is ordinarily more difficult to maintain because of greater complexity and more moving parts.

The preferred equipment for injection of high velocity steam jets into a stream of protein solution may suitably be a Thermal Cooker manufactured by the Thermal Cooker Corp. and described in U.S. Patent 2,678,276. Another device suitable for imparting the high velocity steam jets to a flowing stream of protein solution is a Hydro-Heater manufactured by the Sirod Corp. of Milwaukee, Wisconsin and described in U.S. Patent 1,987,883. While these devices differ structurally, both are free of moving parts, and introduce high velocity steam jets into a flowing stream of liquid passing through them. And both can be operated at superatmospheric pressure.

The following examples illustrate preferred methods for the carrying out of the present invention.

*Example 1*

In a mixing vessel provided with an agitator, 4500 parts of casein are wet with sufficient cold water to yield a solids concentration of 27%. After an initial swelling period of about 20 minutes, alternate additions of ammonia (28% concentration) and dicyandiamide were added until 20% (dry basis) of each had been worked into the casein-water slurry. The addition of dicyandiamide raises the solids concentration to 30%, but the material acts as a viscosity reducer. The mixture was then heated to 86° F. with agitation for about 30 minutes. At this point, a smooth well-dispersed casein solution was obtained. The casein solution was then divided into two parts and one part set aside for preparation of a coating composition as a control test.

The other part of the casein solution prepared as above was then passed through a Hydro-Heater with an inlet pressure of 90 pounds per square inch gauge and 53 pounds per square inch gauge back pressure with a temperature of the casein solution reaching 300° F. Flow rate ranged from 0.34 to 2 gallons per minute. The casein solution passing through the Hydro-Heater was then incorporated in a coating composition using 14.5% (dry basis) of casein solution and 85.5% coating clay (0.75% tetrasodium pyrophosphate was used to disperse the clay). An identical coating composition was prepared from that portion of the casein solution which did not receive the treatment in the Hydro-Heater and both coatings were then adjusted to identical solids concentration of 55.1% (dry basis).

For further comparisons, still another coating composition was prepared using 14.5% (dry basis) of delta protein (a typical commercial prehydrolyzed soya protein of medium viscosity) as designated by the supplier. The soya protein was made into an alkaline solution by addition of 15% ammonia and 20% dicyandiamide, both based on the dry weight of protein.

The three coatings were then applied to paper under identical conditions of speed and metering pressure, and to the same base stock. Since the solids content of the three coatings was essentially identical, and the conditions for application to the paper web were identical, the difference in coating weight applied to the web is a measure of the viscosity of the composition under the application conditions. It was found that the coating composition prepared with untreated casein applied a coat weight of 9.3 pounds per ream; that prepared with the prehydrolyzed soya protein applied a coating weight of 7.0 pounds per ream; while the coating composition prepared with casein which had been passed through the Hydro-Heater resulted in a coating weight of 5.3 pounds per ream. A comparison of the coated papers showed that the two prepared with the pre-hydrolyzed soya protein and with the treated casein were much smoother and free of surface patterns as compared to that produced with the coating composition containing untreated casein.

*Example 2*

Since the dissolution of casein in alkalies represents at least a partial hydrolysis of the polypeptide polymer, the following procedure was followed to compare the action of high temperature and high shear on casein which had been dissolved with a relatively high ratio of alkali to casein. In this example, a casein solution was prepared by dissolving casein with 7% sodium carbonate, 4% of sodium hydroxide, and 20% dicyandiamide. After the casein had been wetted with cold water and the chemicals added, the mixture was heated to 140° F. for 30 minutes and then exposed to a quick heating to 150° F. At this point it was divided into two portions and one portion passed through the Hydro-Heater under conditions similar to those outlined for Example 1. Both portions were then incorporated into coating compositions which utilized 62% clay, 25% satin white, 10% of the casein solution (dry basis) and 3% of a butadiene-styrene latex (dry basis). Both coating compositions were applied to paper on a paper machine at 700 feet per minute using 120 pounds per lineal inch metering pressure.

The coating made by the severe alkali solubilizing of the casein without Hydro-Heater treatment gave a coat weight of 13.3 pounds from a composition of 48.7% solids. The coating composition prepared from casein which received treatment in the Hydro-Heater yielded a coating weight of 8.3 pounds per ream at a slightly lower solids (47.3%). Both coating compositions were then measured for viscosity and it was found that the casein which did not receive the Hydro-Heater treatment resulted in a coating composition with a viscosity of 26 poises while that which had received treatment in the Hydro-Heater resulted in a coating composition with a viscosity of 7 poises. Again, the casein which had been processed in the Hydro-Heater resulted in a coating composition which was remarkably free of surface pattern, was adequately waterproof for litho printing, and exhibited excellent printing qualities. The control test gave an objectionable amount of coating pattern and this was reflected in a lower printing quality.

*Example 3*

To a suitable mixing chamber provided with an agitator were added 100 parts unhydrolyzed soya protein and sufficient water to give a solids content of 25%. After mixing to thoroughly wet out the protein particles, ammonia to the extent of 20 parts (dry basis) was added and the mixture heated to 140° F. for 30 minutes. The mixture was then separated into two portions.

One portion was then passed through a Thermal Cooker at an inlet pressure of 110 pounds per square inch gauge with 70 pounds per square inch gauge back pressure. In passing through the Thermal Cooker, the temperature reached 295° F. A high solids paper coating composition was prepared from the portion passing through the Thermal Cooker utilizing 88% clay and 12%, dry basis, of the soya protein solution. It was found that that portion of the soya protein which was not treated in the Thermal Cooker was too viscous to prepare a usable high solids coating composition and it was therefore discarded. The coating composition containing the soya protein which was passed through the Thermal Cooker was then applied to a paper web on a high speed paper machine yielding a smooth film substantially free of surface pattern and of excellent printability.

*Example 4*

In this example, the protein used in soya flour, the ground product derived from soya bean cake after removal of oil therefrom. Soya flour contains about 50% of soya protein and about 50% of carbohydrate with some cellulose fiber.

100 parts of soya flour are wetted out with sufficient water to produce a solids concentration of 25%. This slurry was then heated to a temperature of about 180° F. to inactive natural enzymes within the soya flour so as to prevent uncontrolled changes in the protein polymer. Immediately after inactivation of the natural enzymes, the slurry was reduced in temperature to approximately 120° F. and 0.008% of a proteolytic enzyme was added to bring about a preliminary partial hydrolysis of the protein structure. The mix was then again heated to inactivate the remaining enzyme and, after cooling, was then processed in a pug mill or similar shearing device after addition of fluidizers and alkali, such as 20% dicyandiamide and 20% ammonia (dry basis).

At this stage, the soya flour dispersion had a viscosity which was about the equivalent of that manifested by isolated soya protein which had undergone a hydrolytic treatment. The dispersion was next passed through a Hydro-Heater with 95 pounds per square inch gauge pressure on the inlet side and a back pressure of 60 pounds per square inch gauge with a flow rate of 8 gallons per minute through the Hydro-Heater. The conditions of high shear and temperature (270° F.) attained in the passage through the Hydro-Heater resulted in a further lowering of the viscosity of the soya flour dispersion, and also served to disperse the carbohydrate fraction. Since the product emerging from the Hydro-Heater was quite fluid at the discharge temperature (of the order of 270° F.), it was passed through a filter or screen to remove undispersed cellulose fibers. The resulting product was then used to prepare high solids paper coating compositons as outlined hereinbefore.

Through the foregoing, there has been frequent reference to high solids coating compositions for direct application on the paper machine. By the term "high solids" is meant solids concentrations above 50%, and more specifically in the range of 55 to 70%. To achieve proper pigment dispersion and proper blending of the pigment component with the adhesive component, the solids concentration of the adhesive fraction must be of the order of 25 to 30% solids to insure sufficient water for the proper dispersion of the pigment fraction. For example, a finished coating composition at 60% solids involves 67 parts of water for each 100 parts of solids contained therein. If this composition contains 10% (dry basis) adhesive which is added to the composition as a 25% solution or dispersion, it carries with it 30 parts of water which leaves only 37 parts of water for dispersing the pigments. Thus, the 90 parts dry basis of pigment must be prepared at a solids concentration of 70.8% in order for the final composition to have a solids concentration of 60%. This concentration of almost 71% for preparing pigment dispersions is about the upper limit that can be used effectively to get thorough dispersion of the pigment articles and emphasizes again the need for the highest possible solids concentration in the adhesive portion of the composition.

While certain preferred methods of the invention have been presented herein in detail, it is understood that the invention embraces all modifications which would be apparent to one skilled in the art and all equivalents which come within the scope of the appended claims.

What is claimed is:

1. In a process for the reduction of the viscosity of proteinaceous materials at elevated temperatures without substantial discoloration thereof, the step which comprises subjecting an aqueous alkaline solution of a proteinaceous material to simultaneous high shear agitation and heating to above 270° F. for a relatively short period of time to effect reduction of the viscosity of said proteinaceous material without substantial discoloration thereof, by injecting high velocity steam at superatmospheric pressures into a stream of said aqueous alkaline solution of a proteinaceous material.

2. This process of claim 1, wherein the proteinaceous material is selected from the group consisting of casein, soya flour and native soya protein.

3. The process of claim 1, wherein the proteinaceous material has been subjected to a preliminary hydrolysis before being made into an aqeous alkaline solution.

4. The process of claim 1, wherein said stream of aqueous alkaline solution of proteinaceous material is heated to a temperature within the range of 270–300° F.

5. The process of claim 1, wherein said aqueous proteinaceous material is made alkaline with ammonia.

6. The process of claim 1, wherein said aqueous alkaline solution of proteinaceous material contains dicyandiamide.

7. The process of claim 1 wherein the proteinaceous material is subjected to partial hydrolysis, the resulting product mixed with water, ammonia and dicyandiamide and the resulting suspension subjected to simultaneous high shear agitation and heating to 270–300° F. by injecting high velocity steam at superatmospheric pressure into a stream of said resulting aqueous proteinaceous material and recovering the substantially color-free protein solution of reduced viscosity.

8. The process of claim 1 wherein the stream of aqueous alkaline proteinaceous material is injected into the high shear agitator-heater at an inlet pressure of 90–110 pounds per square inch gauge and at a back pressure ranging from 53 to 70 pounds per square inch gauge.

9. The process of claim 1 wherein the stream of proteinaceous material is injected into said steam jets at the rate of 0.34 to 8 gallons per minute.

10. The process of claim 1, wherein the ratio of protein to water in said aqueous alkaline solution is within the range of 25 to 35% solids.

References Cited
UNITED STATES PATENTS

| | | | |
|---|---|---|---|
| 2,271,620 | 2/1942 | Brier et al. | 106—154 |
| 2,318,046 | 5/1943 | Bersworth | 260—119 |
| 2,538,898 | 1/1951 | Cleland et al. | 106—154 |
| 2,559,848 | 7/1951 | Codwell | 106—146 |
| 2,581,112 | 1/1952 | Landes | 106—146 |
| 2,810,657 | 10/1957 | Preusser | 106—154 |
| 3,021,321 | 2/1962 | Young et al. | 260—119 |
| 3,081,182 | 3/1963 | Mahoney | 106—146 |

ALEXANDER H. BRODMERKEL, *Primary Examiner.*

DONALD V. ARNOLD, *Assistant Examiner.*